(12) United States Patent
Schlebusch

(10) Patent No.: US 8,936,822 B2
(45) Date of Patent: Jan. 20, 2015

(54) PROCESS FOR MANUFACTURING AN ANIMAL FEED OR FOOD AND PRODUCT OBTAINED BY THAT PROCESS

(75) Inventor: Johannes P. Schlebusch, Thedinghausen (DE)

(73) Assignee: Mars, Inc., McLean, VA (US)

( * ) Notice: Subject to any disclaimer, the term of this patent is extended or adjusted under 35 U.S.C. 154(b) by 795 days.

(21) Appl. No.: 12/305,169

(22) PCT Filed: Jun. 20, 2007

(86) PCT No.: PCT/EP2007/005407
§ 371 (c)(1),
(2), (4) Date: Mar. 17, 2009

(87) PCT Pub. No.: WO2008/006448
PCT Pub. Date: Jan. 17, 2008

(65) Prior Publication Data
US 2010/0068368 A1  Mar. 18, 2010

(30) Foreign Application Priority Data

Jul. 10, 2006  (DE) .......................... 10 2006 031 794

(51) Int. Cl.
*A23L 1/31*      (2006.01)
*A23L 1/18*      (2006.01)
(Continued)

(52) U.S. Cl.
CPC ............. *A23L 1/31418* (2013.01); *A23K 1/001* (2013.01); *A23K 1/10* (2013.01); *A23K 1/103* (2013.01);
(Continued)

(58) Field of Classification Search
USPC .......................... 426/574, 448, 513, 104, 517
See application file for complete search history.

(56) References Cited

U.S. PATENT DOCUMENTS 1,678,056 A * 7/1928 Colgin .......................... 426/650
2,104,355 A * 1/1938 Rupp et al. ..................... 277/368
(Continued)

FOREIGN PATENT DOCUMENTS

EP          191572 A2    8/1986
EP       818154 A1 *    1/1998
(Continued)

OTHER PUBLICATIONS

Alfonso L., Mourot J., Insausti K., Mendizabal J. A., Arana A. Comparative description of growth, fat deposition, carcass and meat quality characteristics of Basque and Large White pigs. Animal Research (2005). vol. 54. p. 33-42.*

(Continued)

*Primary Examiner* — Rena L Dye
*Assistant Examiner* — Assaf Zilbering
(74) *Attorney, Agent, or Firm* — Fulbright & Jaworski LLP

(57) ABSTRACT

The present invention relates to a process for manufacturing an animal feed or a foodstuff, comprising the steps of (i) preparing at least one first stream of material and at least one second stream of material, (ii) dispersing the second stream of material in the first stream of material in a laminar fashion in a device for at least partially incompletely blending the first and second streams of material, so that the second stream of material is distributed in the first stream of material preferably in the form of droplets ranging in size from 0.3 mm to 8 mm, (iii) discharging the first stream of material containing the second stream of material in the form of droplets through a nozzle, and (iv) solidifying the first stream of material containing the second stream of material in the form of droplets.

16 Claims, 3 Drawing Sheets

(51) Int. Cl.
    A22C 7/00      (2006.01)
    A23G 3/50      (2006.01)
    A23G 9/44      (2006.01)
    A23G 3/02      (2006.01)
    A23L 1/314     (2006.01)
    A23K 1/00      (2006.01)
    A23K 1/10      (2006.01)
    A23K 1/18      (2006.01)
    A23L 1/00      (2006.01)
    A23L 1/0534    (2006.01)
    A23L 1/0562    (2006.01)
    A23L 1/317     (2006.01)
    A23L 1/325     (2006.01)

(52) U.S. Cl.
    CPC .............. A23K 1/1866 (2013.01); A23L 1/0067 (2013.01); A23L 1/0534 (2013.01); A23L 1/0562 (2013.01); A23L 1/31427 (2013.01); A23L 1/317 (2013.01); A23L 1/3255 (2013.01)
    USPC .......... 426/574; 426/448; 426/513; 426/104; 426/517

(56) References Cited

U.S. PATENT DOCUMENTS

| | | | | |
|---|---|---|---|---|
| 3,851,570 | A | * | 12/1974 | Charter ................. 99/450.2 |
| 3,897,572 | A | * | 7/1975 | Riggs et al. .................... 426/249 |
| 4,303,682 | A | * | 12/1981 | Guitteny et al. .............. 426/250 |
| 4,358,468 | A | * | 11/1982 | Dolan et al. .................. 426/250 |
| 4,372,734 | A | * | 2/1983 | Dolan et al. ................. 425/131.1 |
| 5,342,673 | A | * | 8/1994 | Bowman et al. .............. 428/198 |
| 6,067,776 | A | * | 5/2000 | Heuer et al. .................... 53/440 |
| 6,613,372 | B1 | * | 9/2003 | Schlebusch et al. .......... 426/513 |
| 2005/0032240 | A1 | * | 2/2005 | Lee et al. ....................... 436/180 |

FOREIGN PATENT DOCUMENTS

| | | |
|---|---|---|
| EP | 0818154 A1 | 1/1998 |
| EP | 1047307 A1 | 11/2000 |

OTHER PUBLICATIONS

International Search Report issued Oct. 4, 2007 during the prosecution of International Application No. PCT/EP2007/005407.

Written Opinion issued Oct. 4, 2007 during the prosecution of International Application No. PCT/EP2007/005407.

International Preliminary Report on Patentability issued Jan. 13, 2009 during the prosecution of International Application No. PCT/EP2007/005407.

* cited by examiner

PROCESS FOR MANUFACTURING AN ANIMAL FEED OR FOOD AND PRODUCT OBTAINED BY THAT PROCESS

CROSS-REFERENCE TO RELATED APPLICATIONS

This application is a national stage of PCT/EP2007/005407 filed Jun. 20, 2007 claiming priority to DE 102006031794.7 filed Jul. 10, 2006.

TECHNICAL FIELD

The present invention relates to a process for manufacturing an animal feed or a foodstuff and a product manufactured by that process. In the animal feed and food industry, the problem arises in a variety of ways as to how products can be manufactured simply and efficiently, which in particular have the appearance of natural or original pieces of meat or fish, but which are produced from small portions of meat and fish or meat or fish-like components.

BACKGROUND OF THE INVENTION

In this connection, products are well-known which are manufactured using meat or fish emulsions.

Meat emulsions have long been used on a large scale in the animal feed and food industries, especially in the field of food for pets. In this context, there is a need to use as great a proportion as possible of the meat raw materials, optionally in combination with vegetable proteins, since they are important nutrient carriers for proteins, minerals, trace elements, fat and vitamins, they are well tolerated and easily digestible and are at the same time tasty and thus provide an ideal basis for an adequate nutrient intake.

The general problem in this connection is that any meat (or fish) raw materials which are not pre-treated lose virtually all their original texture during the inevitably necessary sterilisation process in the manufacture of such products. That, however, is a decisive factor for acceptance by human beings and animals.

From EP 1 047 307 B1, a process for manufacturing an animal feed or a foodstuff is known, for example, in which different streams of material are arranged in layers, one on top of the other, and are then subjected to processing conditions under which one stream of material liquefies and another one solidifies. For this process, the correct adjustment of the viscosities of the different streams of material is of crucial importance.

The invention is therefore based on the problem of improving known processes for manufacturing animal feed or foodstuffs in such a way that in particular the process management is considerably less expensive and more efficient.

BRIEF SUMMARY OF THE INVENTION

This problem is solved in accordance with the invention by a process for manufacturing an animal feed or a foodstuff, comprising the steps of:

(i) preparing at least one first stream of material and at least one second stream of material, (ii) dispersing the second stream of material in the first stream of material in a laminar fashion in a device for at least partially incompletely blending the first and second streams of material, so that the second stream of material is distributed in the first stream of material preferably in the form of droplets ranging in size from 0.3 mm to 8 mm, (iii) discharging the first stream of material containing the second stream of material in the form of droplets through a nozzle, and (iv) solidifying the first stream of material containing the second stream of material in the form of droplets.

In the process, it is preferable that before, during or after solidification, the first stream of material containing the second stream of material is cut into pieces of suitable size, preferably perpendicularly to the direction of discharge from the nozzle.

It is also particularly preferred that the device for at least partially incompletely blending is a static mixer.

The first stream of material may comprise a meat or fish emulsion.

One embodiment is characterised by the fact that the second stream of material comprises a viscous gel, a second meat emulsion with texture characteristics different from the first stream of material, a gelatine-based liquid and/or a fat/oil mixture. Different texture characteristics of meat emulsions can be achieved by different concentrations of plasma protein, soya isolate and/or vital wheat gluten.

The solidification is preferably achieved by subjecting to heat.

In this context, it is particularly preferred that the subjection to heat should occur in a sterilisation step.

Alternatively, solidification can also be achieved by passing the product through a steam tunnel or by allowing it to flow through a tube while at the same time subjecting it to radio frequency radiation (13 or 27 MHz) or microwaves (e.g. 433 MHz or 915 MHz).

The first and the second streams of material are advantageously used in a weight ratio of from 50:50 to 95:5, and the weight ratio is particularly preferably 80:20-90:10, particularly preferably 85:15.

The first stream of material can advantageously comprise, in addition, fibrous material, fibre-containing material and/or cereal flour. Dyes, pigments, functional ingredients, flavourings, spices etc. may also be included.

It is also preferred that the viscous gel should contain a gel-forming substance from the group comprising carboxymethyl cellulose, guar gum and other hydrocolloids, aspic, gelatine and/or stock; it is particularly preferred for the viscous gel to comprise carboxymethyl cellulose. The second stream of material may also contain flavourings, spices, pigments, dyes or stock.

As fat or a fatty substance, it is possible to use a substance commonly used in the baking industry, preferably margarine, butter, butter fat, pastry fat, palm oil and/or beef suet.

In addition, a preferred process is proposed, comprising an additional step (iia), in which, after the laminar dispersion in step (ii), an additional second stream of material is introduced into the first stream of material in a device comprising a hollow shaft into which the second stream of material is introduced at a feed end thereof and fed to a discharge end, the hollow shaft being surrounded, at least at the discharge end, substantially concentrically by a tube via which the first stream of material is fed to the discharge end of the hollow shaft, wherein, at the discharge end of the hollow shaft, inside the tube, the second stream of material is introduced into the first stream of material via a distribution device.

In this context, it is preferred that the additional second stream of material is introduced into the first stream of material via an impeller wheel.

It is also preferably proposed that the nozzle is a slot nozzle.

The invention further relates to an animal feed or foodstuff which can be produced according to the process of the invention.

The expression "laminar dispersion" as used in the context of the present invention is intended to mean the blending of at least one first stream of material and at least one second stream of material, where one of the streams of material is distributed in the second as a phase in such a way that that phase can still be seen with the naked eye. It is assumed that corresponding phase droplets with a diameter of <0.1 mm can no longer be seen with the naked eye. If the droplet diameter is smaller than or equal to 0.1 mm, it is assumed that complete blending of the streams of material has occurred.

In addition, a viscous gel can preferably be used as the second stream of material. The viscosity of the gel can be between 10,000 mPas and 500,000 mPas, measured with a Brookfield Viscometer RVDVIII, spindle 7, 10 rpm, temperature 20° C.

The present invention is based on the surprising finding that, using the process of the invention, it is possible to produce in an extremely simple and inexpensive manner an animal feed or foodstuff which corresponds in texture to natural or original meat or fish pieces. It is of crucial importance for the process of the invention first of all that droplets of the second stream of material ranging in size from 0.3 mm to 8 mm are distributed in the first stream of material, which can preferably be achieved by means of laminar dispersion using a static mixer. Secondly, it is crucial that the stream of material obtained in this way, with droplets dispersed therein, is discharged through a nozzle, preferably a slot nozzle, so that the droplets of the second stream of material contained in the first stream of material are stretched lengthwise. The product blend discharged from the nozzle can then solidify, preferably during a sterilisation process, for example, after which the material can be cut up, preferably perpendicularly to the direction of discharge from the nozzle, in order to provide the product with a texture which is very similar to that of an original piece of meat.

The viscosities of the streams of material used in the manufacturing process do not play a decisive role.

In one preferred embodiment of the invention, it is likewise possible to produce a fish-based animal feed or foodstuff, which exhibits the coarse structure that is typical of fish in fish fillet. For this purpose, after the laminar dispersion of the second stream of material in the first stream of material, a further device is used, in which an additional second stream of material is introduced into the first stream of material in a coarser form. Inside that device, the second stream of material to be delivered is conveyed via a hollow shaft to the discharge end thereof. The hollow shaft is surrounded, especially in the region of the discharge end and beyond, substantially concentrically by a tube via which the first stream of material (already processed in accordance with steps (i) and (ii)) is conveyed to the discharge end of the hollow shaft. At the discharge end of the hollow shaft, a distribution device, preferably an impeller wheel, is provided, with which the second stream of material can be coarsely distributed in the first stream of material, substantially in a spiral manner. During the further processing in accordance with the process of the invention, coarse, chunky components of the second stream of material are produced in the first stream of material. This corresponds to the coarse structure which is typical of fish in fish fillet, for example, which is essentially characterised by the act that a lighter or darker "linear structure" is visible inside the fish fillet, which may, for example, be caused by discolorations of the fish meat or by higher proportions of fat.

The proportion of the further second stream of material preferably amounts to 5-10% by weight based on the weight of the first stream of material.

BRIEF DESCRIPTION OF THE DRAWINGS

Further features and advantages of the process according to the invention will become clear from the following detailed description, in which one embodiment of the invention is described by way of example, with reference to the enclosed drawing, in which.

DETAILED DESCRIPTION OF THE INVENTION

Figure 1:
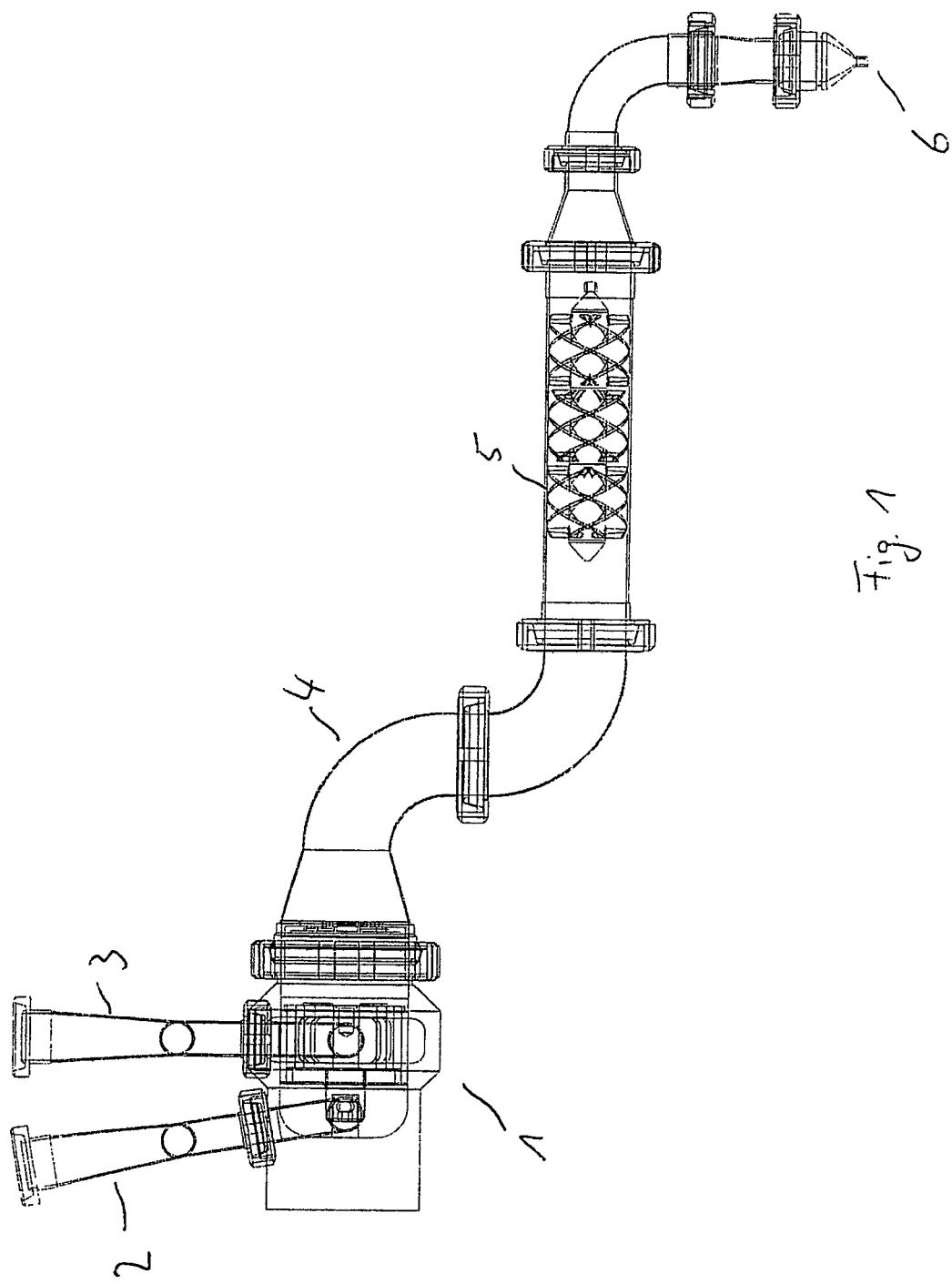
FIG. 1 shows a device for carrying out the process of the invention.

FIG. 1 shows a device for carrying out the process of the invention. The device comprises an ITN head 1, into which two different streams of material can be introduced via feed lines 2 and 3. From the ITN head 1, the streams of material pass via a line 4 to a static mixer 5, where the streams of material are at least partially incompletely blended. From the static mixer 5, the at least partially unblended streams of material are conveyed to a slot nozzle 6, via which they are discharged from the device. The mixture obtained can then optionally be poured into moulds, sterilised and finally cut/shaped and packaged.

In order to carry out the process of the invention, therefore, two streams of material are dispersed with one another in a laminar fashion in such a way that droplets of the second stream of material form in the first stream of material, which range in size from 0.3 mm to 8 mm, preferably 2 mm to 5 mm. The first stream of material in this case is preferably a meat or fish emulsion, which may also contain meat or fish-like components or components of meat and fish which cannot otherwise be further processed. The second stream of material is preferably a viscous gel, a second meat emulsion, with texture characteristics different from the first meat emulsion, or a fat/oil mixture.

When the second stream of material has been dispersed in a laminar fashion into the first stream of material, and when the droplets of the second stream of material are of appropriate sizes, the mass obtained is discharged through a slot nozzle, as a result of which the droplets of the second stream of material contained in the first stream of material are stretched, in order to produce a strip-like or fibrous texture within the first stream of material in this way. After being discharged through the nozzle, the mass obtained is solidified and can, before, during or after solidification be cut up, preferably perpendicularly to the direction of discharge from the slot nozzle. The solidification can take place in a sterilisation step at an elevated temperature. The chunks of product then obtained in this way can be packaged—in cans, for example—in this form, with an appropriate sauce added.

In the following, three examples A, B and C of manufacturing an animal feed or a foodstuff using the process of the invention are described. For Examples A, B and C, the ingredients shown in the following table were used (quantities given in percent by weight).

TABLE

| Ingredient | A1: Fibrous meat, type: chicken meat | B1: Fibrous fish meat | C1: Beef, type: "Kobe/Wagyu" |
|---|---|---|---|
| Pig stomach | 11% | | |
| Chicken liver | 43% | 6% | |
| Turkey separator meat | 36% | | |
| Animal or vegetable protein extracts | 6 | 10 | |
| Vitamins, salts, minerals, fibres | 4% | 4% | 4% |
| Fish parts, fish offcuts | | 80% | |
| Ox hearts | | | 20% |
| Ox liver | | | 30% |
| Ox lung | | | 10% |
| Beef thin skirt | | | 36% |

| Ingredient | A2: Gel for fibrous meat, type: chicken meat | B2: Gel for fibrous fish meat | C2: Fatty phase for beef, type: "Kobe/Wagyu" |
|---|---|---|---|
| Carboxymethyl cellulose | 3% | | |
| Salts, minerals, pigments, dyes, spices, stock | 2% | 2% | 2% |
| Gelatine | | 6% | |
| Beef suet | | | 98% |
| Water | 95% | 92% | |

The A1, B1 and C1 phases are each produced by mincing and fine cutting at a final temperature not exceeding 20° C.

The A2 phase is produced by intimately mixing the powder using water (water temperature 50° C.) in a cutter. The B2 phase is produced, after the gelatine has been allowed to soak, by intimately mixing the powder using hot water (water temperature 80° C.) in a cutter. This mass is cooled to 30° C. while being stirred. The C2 phase is produced by intimately mixing the beef suet, which has been melted at 50° C., with the powder in a cutter. This mass is cooled to 15° C. while being stirred, in order to obtain a viscous fatty phase which is capable of being pumped.

With the device shown in the Figure, 90% by weight A1 is then dispersed in a laminar fashion with 10% by weight A2, and similarly 85% by weight B1 is dispersed in a laminar fashion with 15% by weight B2 and 75% by weight C1 with 25% by weight C2.

After the heat treatment, product A has a fibrous meaty appearance typical of chicken meat on all the cut surfaces.

After the heat treatment and subsequent cooling to 20° C., product B has a fibrous appearance typical of fish fillet meat on all the cut surfaces.

After the heat treatment and subsequent cooling to 20° C. product C has a fibrous meaty appearance/fat marbling typical of beef of the Kobe/Wagyn type on all the cut surfaces.

Figure 2:
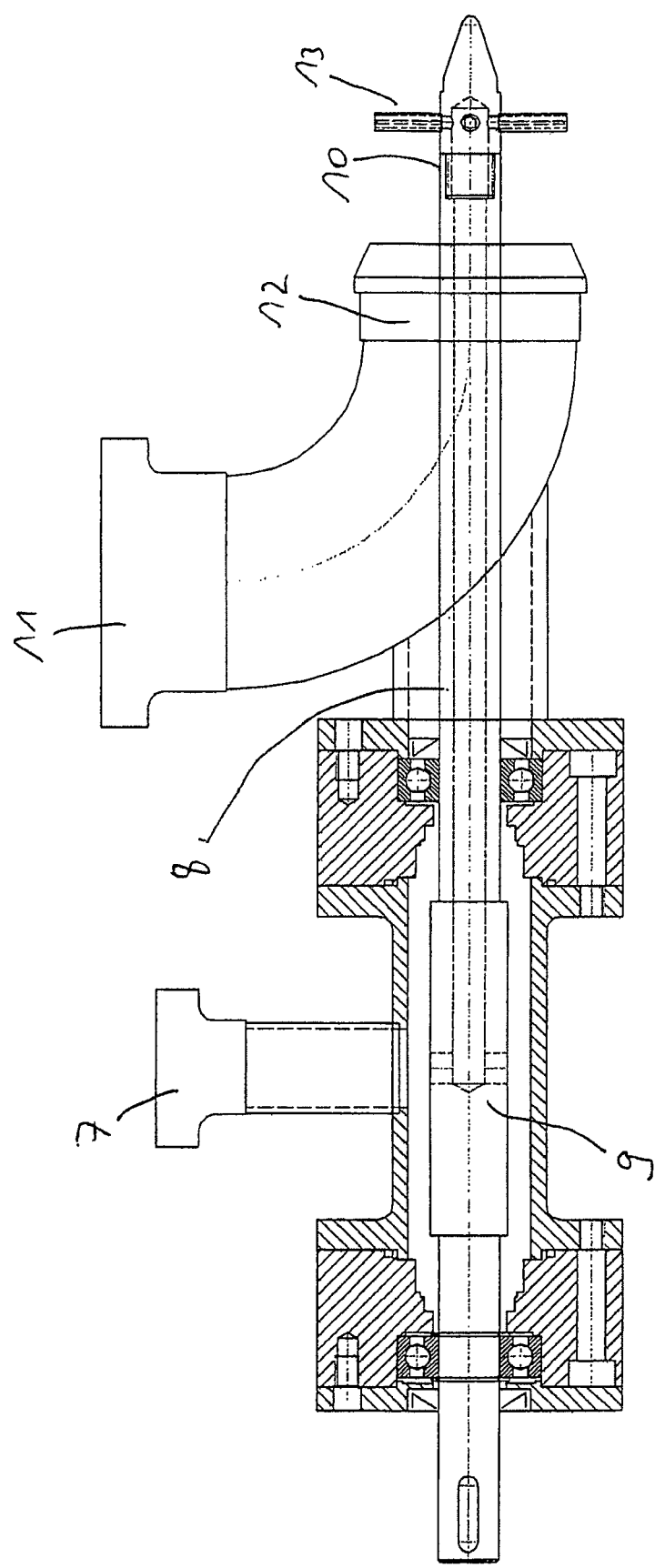
FIG. 2 shows a device which, in a preferred process according to the invention, serves to introduce a further second stream of material into the first stream of material.
Figure 3:
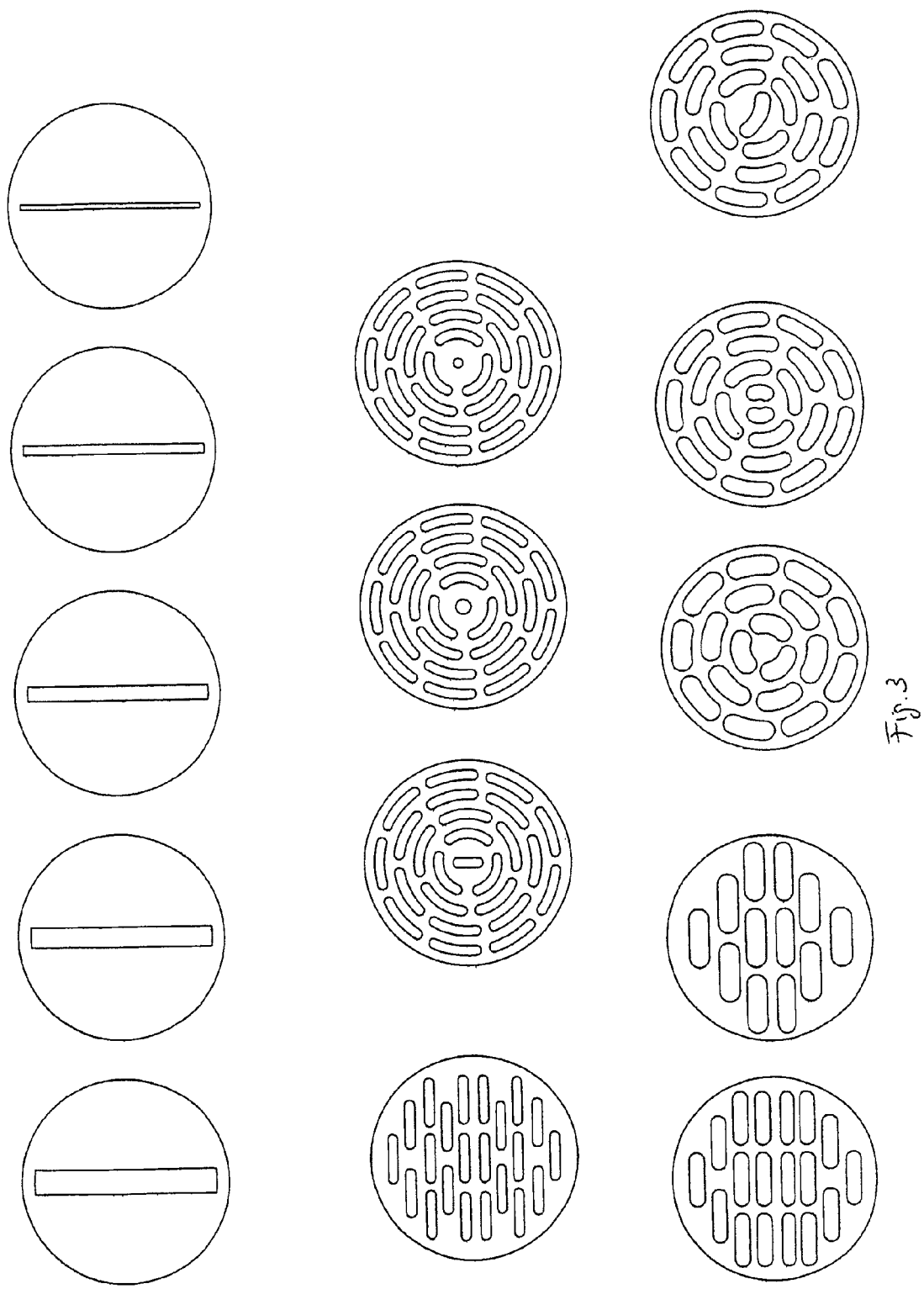
FIG. 3 shows possible nozzle cross-sections of a nozzle which can preferably be used in the context of the process of the invention.

In a preferred embodiment of the process, a fish emulsion in particular can be processed in such a way that it is possible to recreate, in the product manufactured, the coarse structure which is typical of fish in fish fillet. One device that can be used in this connection is shown in FIG. 2. When this device is used, a second stream of material is delivered via a feed means 7 in a hollow shaft 8 at a feed end 9 of the hollow shaft 8 and is fed in the direction of a discharge end 10 of the hollow shaft 8. Via a further feed means 11, a first stream of material, which preferably comprises a fish emulsion, is introduced into a tube 12 which substantially concentrically surrounds the hollow shaft 8 at least in the area of the discharge end 10 and beyond. The first stream of material is fed through the tube 12. For illustration purposes, the tube 12 is shown in FIG. 2 not projecting beyond the discharge end 10 of the hollow shaft 8. It is, however, obvious to a person skilled in the art that this tube 12 must project beyond the discharge end 10 of the hollow shaft 8. There is a distribution device 13, preferably an impeller wheel, disposed at or shortly behind the discharge end 10 of the hollow shaft 8. When the impeller wheel 13 is rotated, a second stream of material arriving at the discharge end 10 is introduced into the first stream of material in a substantially spiral manner. The introduction is relatively coarse, so that the phase produced in the first stream of material by the second stream of material can be clearly recognised. The product obtained as a result of the introduction of the further second stream of material can be further processed in accordance with the invention via the tube 13, by discharging the product through a nozzle. Cross-sections of such a nozzle are shown in FIG. 3.

The features of the invention disclosed in the above description, and in the claims and drawing can be essential to implementing the invention in its various embodiments both individually and in any combination.

What is claimed is:

1. A process for manufacturing an animal feed or a foodstuff, comprising the steps of:
   (i) preparing at least one first stream of material and at least one second stream of material, wherein the first stream of material comprises a fish emulsion,
   (ii) dispersing the second stream of material into the first stream of material in a laminar fashion in a device for at least partially incompletely blending the first and second streams of material, so that the second stream of material in the form of droplets ranging in size from 0.3 mm to 8 mm are distributed within the first stream of material by means of laminar dispersion,
   (iia) dispersing an additional second stream of material into the incompletely blended first and second streams of material in a device comprising a hollow shaft into which the additional second stream of material is introduced at a feed end thereof and fed to discharge end in which a tube substantially concentrically surrounds the hollow shaft and projects beyond the discharge end, the incompletely blended first and second streams of material is fed to the discharge end of the hollow shaft, wherein, at the discharge end of the hollow shaft, inside the tube, the additional second stream of material is introduced into the incompletely blended first and second streams of material via a distribution device whereby coarse, chunky components of the additional second stream of material are formed in the incompletely blended first and second streams of material;

(iii) discharging the partially blended first, second and additional second streams of material through a nozzle, wherein the droplets of the second stream of material contained within the first stream of material are stretched lengthwise in which the laminar dispersion of the stretched droplets form a strip-like or fibrous texture within the incompletely blended first and second streams of material in addition to the coarse chunky components of the additional second stream of material, and (iv) solidifying the blend of the first and second streams of material in additional to the coarse chunky components of the additional second stream of material, whereby producing an animal feed or foodstuff having the strip-like or fibrous texture of an original piece of fish.

2. The process as claimed in claim 1, wherein that before, during or after solidification, the first stream of material containing the second stream of material is cut into pieces of suitable size perpendicularly to the direction of discharge from the nozzle.

3. The process as claimed in claim 1, wherein the device for at least partially incompletely blending is a static mixer.

4. The process as claimed in claim 1, wherein the second stream of material is selected from the group comprising of a viscous gel, a second meat emulsion with texture characteristics different from the first stream of material, a gelatine-based liquid and/or a fat/oil mixture.

5. The process as claimed in claim 1, wherein the solidification is achieved by subjecting the material to heat.

6. The process as claimed in claim 5, wherein the subjection of the material to heat occurs in a sterilization step.

7. The process as claimed in claim 1, wherein the first and the second streams of material are used in a weight ratio of from 50:50 to 95:5.

8. The process as claimed in claim 7, wherein the weight ratio is about 80:20 to 90:10.

9. The process as claimed in claim 1, wherein the first stream of material further comprises fibrous material, fibre-containing material and/or cereal flour.

10. The process as claimed in claim 4, wherein the viscous gel contains a gel-forming substance from the group consisting of carboxymethyl cellulose, guar gum and other hydrocolloids, aspic, gelatine and/or stock.

11. The process as claimed in claim, 10 wherein the viscous gel comprises carboxymethyl cellulose.

12. The process as claimed in claim 4, wherein the fat or fatty substance is a substance commonly used in the baking industry.

13. The process as claimed in claim 1, wherein the additional second stream of material is introduced into the first stream of material via an impeller wheel.

14. The process as claimed in claim 1, wherein the nozzle is a slot nozzle.

15. The process as claimed in claim 8, wherein the weight ratio is about 85:15.

16. The process as claimed in claim 12, wherein the fat or fatty substance is selected from the group consisting of margarine, butter, butter fat, pastry fat, palm oil and/or beef suet.

* * * * *